June 5, 1934.     B. E. O'HAGAN     1,961,940
REGULATING DEVICE USING COPPER OXIDE RECTIFIERS Original Filed Oct. 14, 1930

INVENTOR
Bernard E. O'Hagan
BY
HIS ATTORNEY

Patented June 5, 1934

1,961,940

UNITED STATES PATENT OFFICE 1,961,940

REGULATING DEVICE USING COPPER OXIDE RECTIFIERS

Bernard E. O'Hagan, Swissvale, Pa., assignor to The Union Switch & Signal Company, Swissvale, Pa., a corporation of Pennsylvania Original application October 14, 1930, Serial No. 488,574. Divided and this application March 31, 1933, Serial No. 663,758

4 Claims. (Cl. 171—229)

My invention relates to regulating devices using copper oxide rectifiers.

One object of my invention is the provision of novel and improved means for regulating the speed of a series wound electric motor.

I will describe one form of apparatus embodying my invention, and will then point out the novel features thereof in claims.

Figure 1:
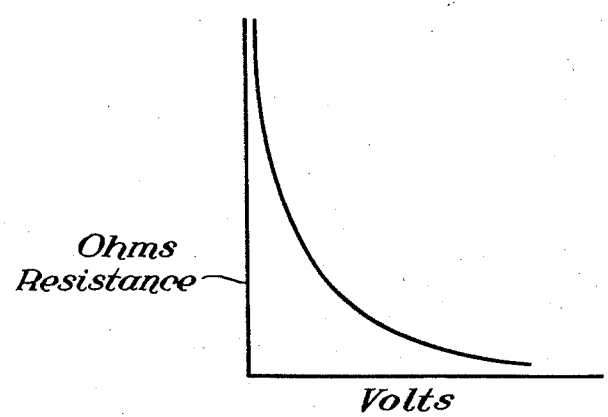
Figure 2:
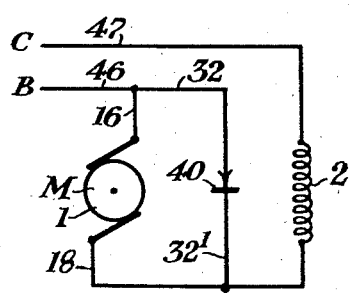

In the accompanying drawing, Fig. 1 is a curve showing certain electrical characteristics of a copper oxide rectifier. Fig. 2 is a diagrammatic view showing one form of apparatus embodying my invention.

The present application is a division of my co-pending application Serial No. 488,574, filed October 14, 1930, for Regulating devices using copper oxide rectifiers.

Referring first to Fig. 1, the curve shown in this view illustrates the voltage-resistance characteristic of the copper oxide rectifier described and claimed in United States Letters Patent No. 1,640,335, granted to L. O. Grondahl on August 23, 1927. This curve shows that as the voltage across the rectifier increases, the resistance in the low resistance direction decreases, and that the decrease of resistance is much more rapid at low voltages than at high voltages.

Referring now to Fig. 2, the reference character M designates a direct current series wound motor, comprising an armature 1 and a field 2, which motor is connected with a source of current, the terminals of which are designated B and C. A copper oxide rectifier 40 is connected in multiple with the armature 1 and is poled to conduct current in the direction in which current is supplied to the field 2. A direct current series wound motor is characterized by the fact that the voltage drop across the armature is roughly proportional to the speed of the motor. When the circuit for motor M is first closed, the voltage across the armature 1 will be low, because this voltage is determined only by the resistance of the armature, and at this time the voltage across the rectifier 40 will also be low, so that the resistance of the rectifier will be high, with the result that practically no current will flow through rectifier 40. As the speed of the motor increases, the counter-electromotive force created by the armature will increase, so that the voltage drop across the armature, and also across the rectifier, will increase. This means that the resistance of the rectifier will decrease, so that as the motor speed increases, the combined effective resistance of the armature and rectifier will tend to remain constant. A point will finally be reached at which an increase in motor speed would result in such a decrease of rectifier resistance that the drop across rectifier and armature will not change, which means that the speed of the motor will not rise above this point. It follows that with the apparatus shown in Fig. 2, for a given voltage applied to the terminals B and C, the parts may be so proportioned that the speed of the motor will be limited to a desired value.

Motor M may also be an alternating current series motor, the regulating properties of rectifier 40 being fully effective during one-half of each voltage cycle, to produce a substantial speed regulating effect. If greater speed regulation is desired, an additional rectifier, similar to rectifier 40 but poled in the opposite direction, may be connected across armature 1, to provide regulation during both positive and negative halves of the voltage cycle.

The main feature of my invention is that since a copper oxide rectifier has the electrical characteristic of lowering its resistance when the voltage across it is increased, the rectifier may be used as a speed regulating device in the manner described.

One advantage resulting from the use of a copper oxide rectifier in the manner described is that, because of the greater resistance change for a given voltage change obtainable with the rectifier as compared with the resistance change of the usual ballast lamp or negative temperature coefficient resistor, more sensitive and more positive speed regulation becomes possible. Another advantage is that since the copper oxide rectifier is practically instantaneous in its response to voltage changes, as contrasted with devices in which a resistance change follows upon a temperature change requiring a time interval, no appreciable time delay occurs before the regulation becomes effective. This factor is of particular importance in the case of series motors having a direct-connected load, because, should the load become accidentally disconnected, the motor speed will be checked before it will have had time to become dangerously high.

It will be apparent that my invention is not limited to the use of the copper oxide rectifier, as any other suitable resistor having a negative resistance-voltage coefficient and the property of changing its resistance instantaneously with voltage changes will provide the useful result to which my invention is directed.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, an electric motor having an armature and a field connected in series, and a copper oxide rectifier connected in parallel with said armature for shunting current from said armature.

2. In combination, a direct current motor having an armature and a field connected in series, and a copper oxide rectifier connected in parallel with said armature and poled to conduct current in the direction in which current is normally supplied to said armature and said field.

3. In combination, an electric motor having an armature and a field connected in series, a source of current for operating said motor, and a copper oxide rectifier connected in parallel with said armature and poled in such direction as to strengthen said field if the voltage drop across said armature is increased.

4. In combination, an electric motor having an armature and a field connected in series, a source of current for operating said motor, and a shunt path around said armature for strengthening said field to regulate the speed of said armature upon an increase of armature speed, said shunt path including a high negative voltage-resistance coefficient resistor characterized by substantially instantaneous changes of resistance with changes in the resistor voltage.

BERNARD E. O'HAGAN.